United States Patent
Tanaka (10) Patent No.: US 8,467,002 B2
(45) Date of Patent: Jun. 18, 2013

(54) DISPLAY DEVICE, BROADCAST RECEIVING APPARATUS, DISPLAY METHOD, AND BROADCAST RECEIVING METHOD

(75) Inventor: Atsushi Tanaka, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 968 days.

(21) Appl. No.: 12/412,893

(22) Filed: Mar. 27, 2009

(65) Prior Publication Data

US 2009/0256916 A1 Oct. 15, 2009

(30) Foreign Application Priority Data

Apr. 9, 2008 (JP) ................................ 2008-101816

(51) Int. Cl.
*H04N 1/60* (2006.01)
*H04N 17/02* (2006.01)

(52) U.S. Cl.
USPC ........... 348/650; 348/655; 348/179; 348/656; 348/739; 345/589; 382/167

(58) Field of Classification Search
USPC ................. 348/655, 656, 708, 739, 725, 728, 348/729, 553, 179; 382/167; 358/516–520; 345/589, 590, 591
See application file for complete search history.

(56) References Cited

U.S. PATENT DOCUMENTS

| | | | | |
|---|---|---|---|---|
| 6,056,408 A | 5/2000 | Kobayashi | ................... | 353/122 |
| 6,719,427 B2 | 4/2004 | Sakashita et al. | ............... | 353/31 |
| 8,111,650 B2 * | 2/2012 | Kim et al. | ..................... | 370/328 |
| 2006/0158411 A1 | 7/2006 | Sakashita | ........................ | 345/89 |
| 2006/0221069 A1 | 10/2006 | Sakashita | ..................... | 345/204 |
| 2009/0073192 A1 | 3/2009 | Kobayashi | .................... | 345/643 |

FOREIGN PATENT DOCUMENTS

| | | |
|---|---|---|
| JP | 2004-32000 | 1/2004 |
| JP | 2005-229153 A | 8/2005 |
| JP | 2007-043355 A | 2/2007 |
| JP | 2008-078750 A | 4/2008 |
| WO | 2007/122987 A | 11/2007 |

OTHER PUBLICATIONS

Japanese Office Action dated Dec. 3, 2012, in related Japanese Patent Application No. 2008-101816.

* cited by examiner

*Primary Examiner* — Jefferey Harold
*Assistant Examiner* — Jean W Desir
(74) *Attorney, Agent, or Firm* — Fitzpatrick, Cella, Harper & Scinto (57) ABSTRACT

A storage unit stores and holds, for each location, a set of location information indicating a location which can be used by a broadcast program and color temperature information in the location. An arithmetic control unit acquires one piece of location information stored and held in the storage unit. A video signal processing unit performs a color correction process for a video signal contained in a broadcast signal on the basis of the color temperature information stored and held in the storage unit and set with the location information acquired by the arithmetic control unit. A display unit displays a video based on the video signal after the correction.

7 Claims, 7 Drawing Sheets

| CATEGORY | FACILITY NAME | COLOR TEMPERATURE | CORRECTION VALUE | CORRECTION CONDITION ||||
|---|---|---|---|---|---|---|---|
| | | | | WEATHER ||| TIME | LIGHTING |
| SPORTS FACILITIES | ○○ DOME | 4800 | | – | – | – | – | – |
| | ×× DOME | 4500 | | FINE | CLOUDY | RAINY | MORNING/EVENING | DAYTIME | OFF | ON |
| | △△ BASEBALL STADIUM | 5000 | 1000 | FINE | CLOUDY | RAINY | MORNING/EVENING | DAYTIME | OFF | ON |
| | · | | | | | | | |
| | ** GYMNASIUM | 7000 | | – | – | – | – | – |
| | ◎◎ STADIUM | 4300 | | FINE | CLOUDY | RAINY | MORNING/EVENING | DAYTIME | OFF | ON |
| | ×× COLISEUM | 5200 | | FINE | CLOUDY | RAINY | MORNING/EVENING | DAYTIME | OFF | ON |
| | · | | | | | | | |
| | □□ ARENA | 6000 | | FINE | CLOUDY | RAINY | MORNING/EVENING | DAYTIME | OFF | ON |
| | ◆◆ RINK | 7000 | | – | – | – | – | – |
| CULTURAL FACILITIES | ○○ THEATER | 5000 | | – | – | – | – | – |
| | △△ HALL | 4500 | | – | – | – | – | – |
| | □□ CULTURE CENTER | 4000 | | – | – | – | – | – |
| | ** VAUDEVILLE THEATER | 3000 | | – | – | – | – | – |
| | ×× OPEN-AIR CONCERT HALL | 6500 | | FINE | CLOUDY | RAINY | MORNING/EVENING | DAYTIME | OFF | ON |
| | · | | | | | | | |

300    301

APPLY    CANCEL

FIG. 4

| Ch254 | Ch253 |
|---|---|
| 16 : 00 – 17 : 00<br>FIGURE SKATING<br>○○ SKATING RINK | 16 : 00 – 18 : 00<br>MBL BROADCASTING<br>× × STADIUM |
| 17 : 00 – 18 : 00<br>．<br>． | |

| | |
|---|---|
| 10000K | |
| 9000K | BLUE SKY IN FINE DAY |
| 8000K | |
| 7000K | SHADE IN FINE WEATHER |
| 6000K | CLOUDY WEATHER |
| 5000K | FINE WEATHER |
| 4000K | FLUORESCENT LAMP |
| 3000K | INCANDESCENT LAMP |

FIG. 7 category, placename, color temp,
SPORTS FACILITIES
,○○ DOME, 4800,
,×× DOME, 4500,
,△△ BASEBALL STADIUM, 5000,
,** GYMNASIUM, 7000,
,◎◎ STADIUM, 4300,
,×× COLISEUM, 5200,
,□□ ARENA, 6000,
,◆◆ RINK, 7000,
CULTURAL FACILITIES
,○○ THEATER, 5000,
,△△ HALL, 4500,
,□□ CULTURE CENTER, 4000,
,** VAUDEVILLE THEATER, 3000,
,×× OPEN-AIR CONCERT HALL, 6500,

DISPLAY DEVICE, BROADCAST RECEIVING APPARATUS, DISPLAY METHOD, AND BROADCAST RECEIVING METHOD

BACKGROUND OF THE INVENTION

1. Field of the Invention

The present invention relates to a technique of receiving a broadcast signal and playing back broadcast program information based on the received broadcast signal.

2. Description of the Related Art

The infrastructure for broadcasting has recently shifted to the infrastructure for digital broadcasting. Along with this shift, high-definition digital broadcasts have been generally viewed. This allows people in homes to enjoy high-quality videos.

Broadcasting is regulated to perform white balance adjustment by adjusting the ratios of R, G, and B so as to match white with a standard color temperature in accordance with illumination conditions in a capturing location and to provide the resultant broadcast programs to homes.

As described above, it is known that when a video is to be captured by using a camera which captures still images, a video camera, or the like, white balance is adjusted in accordance with the state of a light source in a capturing location.

Figure 6:
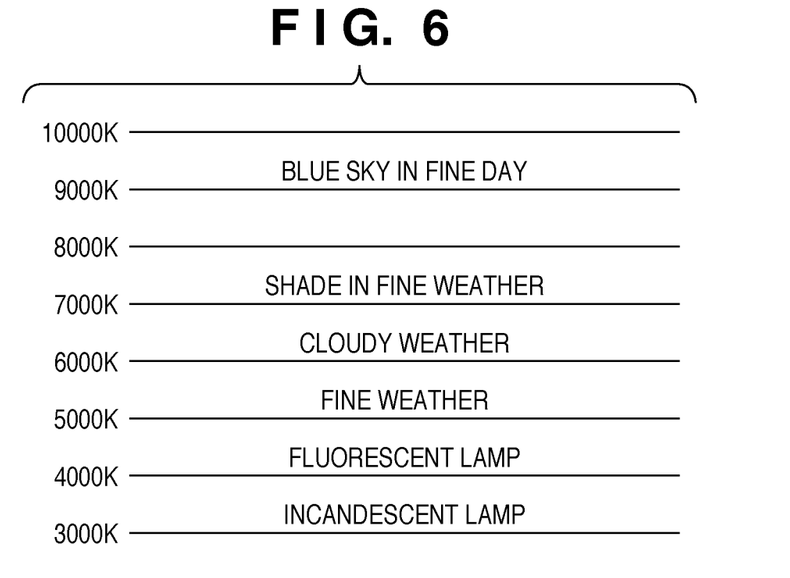
FIG. 6 is a view showing color temperatures under various situations.

For example, as shown in FIG. 6, the average color temperature of sunlight on a fine day is about 5,000K, and that of sunlight on a cloudy day is about 7,000K. It is said that light fixtures have their own color temperatures, and the color temperatures of an incandescent lamp and fluorescent lamp are about 3,000K and 4,500K, respectively. FIG. 6 shows color temperatures under various circumstances.

When the human sees the colors of objects under such a light source, he/she sees the colors while automatically correcting the influences of ambient light. For this reason, the colors of objects which the human sees do not dramatically change even with changes in illumination light.

A video camera or the like using a CCD or a camera tube, however, records the color of an object as it is, and hence a captured video will reflect the color temperature of the light source. That is, if a video camera adjusted to daylight (6,500K) captures an image of a white object without any change under a fluorescent lamp, the captured image becomes bluish. The user has a strange feeling about the image capturing result.

For this reason, a video camera records images upon adjusting the ratios of signals from an image sensing device in accordance with the color temperature of an illumination light source so as to capture an image of a white object as a white image under the illumination.

If the above white balance adjustment has been done, white is defined by equal R, G, and B values.

The color which the human actually perceives as white is not indicated by one point on a chromaticity diagram, and the human recognizes a color close to blackbody radiation as white.

According to television standards such as the NTSC or high-definition (HD) standards, standard white is defined by 6,744K or D65 (6,504K).

That is, if the display color temperature of a transmitted signal (white signal) representing white is set to 6,500K on the television side, the user observes the white signal as white at 6,500K. If such a signal is set to 9,000K, the user observes the signal as white at 9,000K.

Concerning actual television viewing, there is a requirement that color adjustment be performed in accordance with user preference.

In order to meet such user requirement, a general display device is equipped with a function of allowing the user to change adjustment values of hue, color temperature, contrast, sharpness, and the like by, for example, on-screen display (OSD).

Such an apparatus is also equipped with a function of allowing the user to view a broadcast program in a state set by a manufacturer by selecting one of various viewing modes such as a cinema mode, a dynamic mode, and a living mode which are prepared in advance, instead of individually adjusting each adjustment item.

With a recognition that it is troublesome for users to perform the above adjustment for each broadcast program, there has recently been proposed an apparatus, as a receiver function, which performs correction such as color temperature correction, sharpness correction, and various kinds of color correction in accordance with the category of a viewed broadcast program (patent reference 1: Japanese Patent Laid-Open No. 2004-032000).

This apparatus sets an image quality and sound matching the category of a viewed broadcast program selected from an electronic program guide (EPG), which is detected as, for example, "sports", "movie", or "music".

In addition, a product designed to manually designate a category has been on sale. A known product, for example, makes the color green vivid in golf broadcasting or changes the contrast characteristic of display in a broadcast of a skiing activity or the like.

As described above, there is a requirement that television viewing be done with adjustment values matching contents.

Assume that when a lighting in a given capturing location is an incandescent lamp (3,000K), white balance adjustment for a video camera is performed as it is, and a standard gray chart under the lighting is adjusted to output R, G, and B signals at the same ratios.

Assume that a video captured by such a video camera is displayed on a TV set adjusted to 6,500K and a TV set adjusted to 9,000K, and the user views the video on the respective TV sets. In this case, the user observes the video with different color appearances. In addition, this user observes the video in a color under a lighting different from the actual lighting.

Conventionally, in television broadcasting, for so-called real videos, they are broadcast with standard colors, and a TV viewer performs color adjustment and the like in accordance with his/her memories of colors, because the viewing environment of the TV viewer cannot be grasped.

In addition, each user individually performs color adjustment because of lack of basic guidelines or the like, and hence the color tones of viewed videos often differ from those captured.

Broadcast contents should differ in color tone depending on the broadcasting locations.

Consider a baseball broadcast or the like. In this case, different baseball stadiums have different types of lighting equipment, and light differs in state depending on the type of baseball stadium, i.e., whether the baseball stadium is a domed or open stadium.

Even if color correction is performed for each category in such a state as in the prior art, since the illumination conditions in the respective capturing locations differ from each other, optimal correction cannot be performed.

Furthermore, even if a viewer tries to perform adjustment in accordance with the original color tones, since there is no means available to make such adjustment, a viewed video does not reproduce real colors and considerably differs from the actual object.

SUMMARY OF THE INVENTION

The present invention has been made in consideration of the above problem, and provides a technique for providing a user with a video which has undergone color correction in consideration of the color temperature in an actual capturing location.

According to the first aspect of the present invention, a display device comprises: an input unit configured to input a content; a holding unit configured to hold location information indicating a location which is configured to be used by a content and color temperature information in the location in correspondence with each other; an acquisition unit configured to acquire one of pieces of location information held in the holding unit; a correction unit configured to perform a color correction process for the content on the basis of color temperature information held in the holding unit in correspondence with location information acquired by the acquisition unit; and a unit configured to display a video based on the content which has undergone color correction by the correction unit.

According to the second aspect of the present invention, a display method comprises steps of: inputting a content; acquiring one of pieces of location information from a holding unit holding location information indicating a location which is configured to be used by a content and color temperature information in the location in correspondence with each other; performing a color correction process for the content on the basis of color temperature information held in the holding unit and set with location information acquired in the acquiring step; and displaying a video based on the content which has undergone color correction in the correcting step.

According to the third aspect of the present invention, a broadcast receiving apparatus which receives a broadcast signal of a broadcast program transmitted from a selected broadcast station and outputs the broadcast program to a display device on the basis of the received broadcast signal, the apparatus comprises: a holding unit configured to hold location information indicating a location which is configured to be used by a broadcast program and color temperature information in the location in correspondence with each other; an acquisition unit configured to acquire one of pieces of location information held in the holding unit; a correction unit configured to perform a color correction process for a video signal included in a broadcast signal of the broadcast program on the basis of color temperature information held in the holding unit in correspondence with location information acquired by the acquisition unit; and a unit configured to output a video based on the video signal which has undergone color correction by the correction unit to the display device.

According to the fourth aspect of the present invention, a broadcast receiving method performed by a broadcast receiving apparatus which receives a broadcast signal of a broadcast program transmitted from a selected broadcast station and outputs the broadcast program to a display device on the basis of the received broadcast signal, the method comprises steps of: acquiring one of pieces of location information from a holding unit holding location information indicating a location which is configured to be used by a broadcast program and color temperature information in the location in correspondence with each other; performing a color correction process for a video signal included in a broadcast signal of the broadcast program on the basis of color temperature information held in the holding unit in correspondence with location information acquired in the step of acquiring; and outputting a video based on a video signal which has undergone color correction in the step of performing the color correction process to the display device.

Further features of the present invention will become apparent from the following description of exemplary embodiments with reference to the attached drawings.

DESCRIPTION OF THE EMBODIMENTS

The exemplary embodiments of the present invention will be described in detail below with reference to the accompanying drawings. Note that these embodiments are preferred arrangement examples of the present invention defined in the appended claims, and the present invention is not limited to the embodiments described below.

First Embodiment

Figure 1:
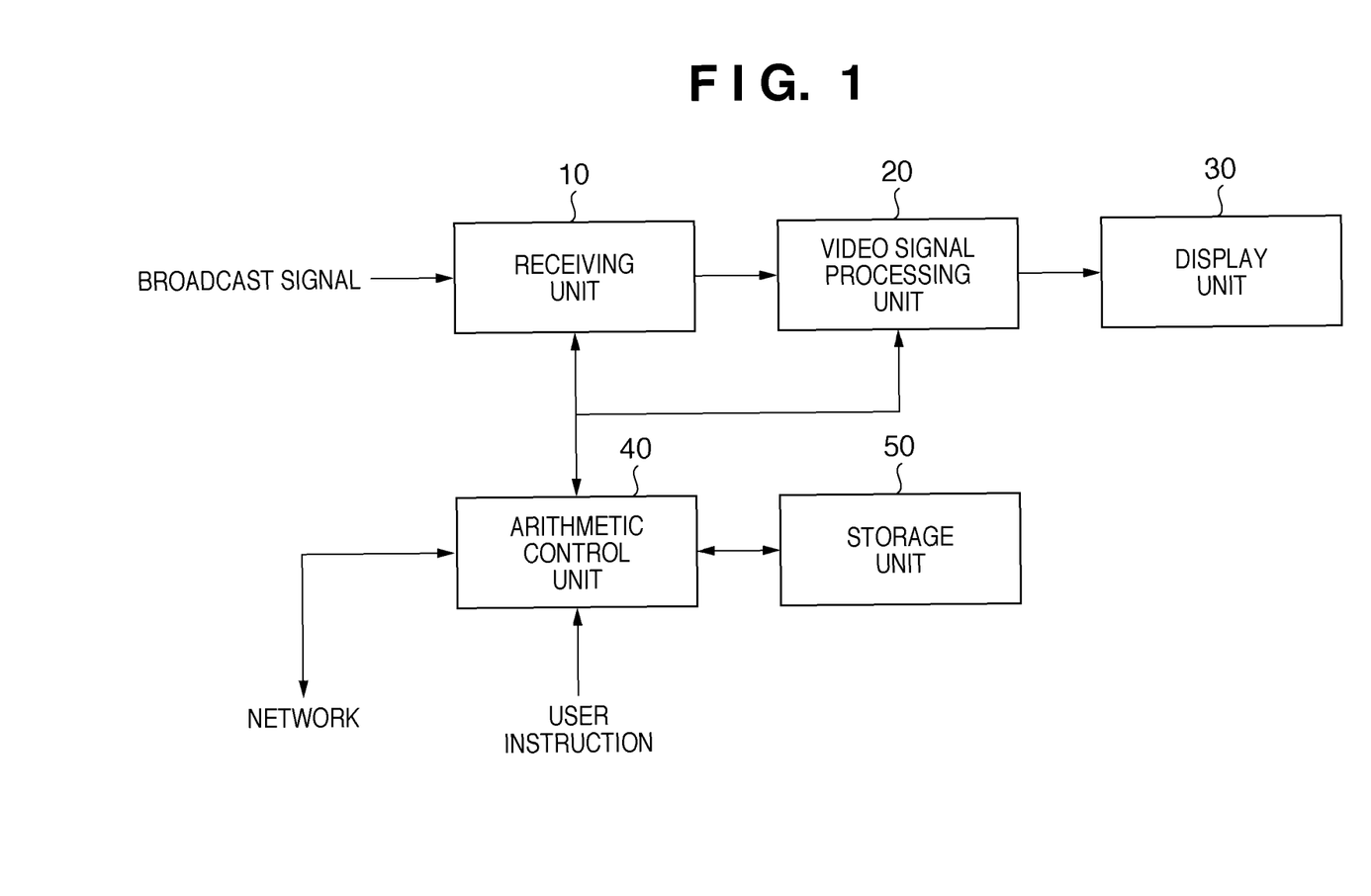
FIG. 1 is a block diagram showing an example of the functional arrangement of a broadcast receiving apparatus according to the first embodiment of the present invention.

FIG. 1 is a block diagram showing an example of the functional arrangement of a broadcast receiving apparatus according to this embodiment. As shown in FIG. 1, the broadcast receiving apparatus according to the embodiment includes a receiving unit 10, a video signal processing unit 20, a display unit 30, an arithmetic control unit 40, and a storage unit 50.

Upon receiving a channel selection instruction from the user, the receiving unit 10 receives a broadcast signal transmitted from a broadcast station indicated by the channel selection instruction, and performs the processing of extracting a video signal, an audio signal, and the like from the received broadcast signal. The extracted video signal is transmitted to the video signal processing unit 20 on the subsequent stage. Note that since no description will be made regarding sound, FIG. 1 does not show any functional arrangement for processing audio signals. In practice, however, the broadcast receiving apparatus according to this embodiment plays back sound as in the prior art, and hence plays back broadcast program information based on a received broadcast signal as a result.

Upon receiving the video signal extracted by the receiving unit 10 from the broadcast signal, the video signal processing unit 20 performs processes for the video signal, including contrast setting, matrix operation, color correction using a lookup table, an individual color process, and sharpness control, and transmits the processed video signal to the display unit 30 on the subsequent stage.

The display unit 30 displays a video based on the video signal received from the video signal processing unit 20.

The arithmetic control unit 40 accepts an instruction (e.g., the above channel selection instruction) from the user while controlling the operation of each unit shown in FIG. 1. The arithmetic control unit 40 then controls the operation of each unit shown in FIG. 1 in accordance with the accepted instruction.

The storage unit 50 stores and holds sets of pieces of location information indicating possible locations where broadcast program capturing can be performed and pieces of color temperature information in the respective locations in correspondence with various locations (for the respective locations). The storage unit 50 further stores and holds various data to be described later. The information stored and held in the storage unit 50 will be described in detail later.

Figure 2:
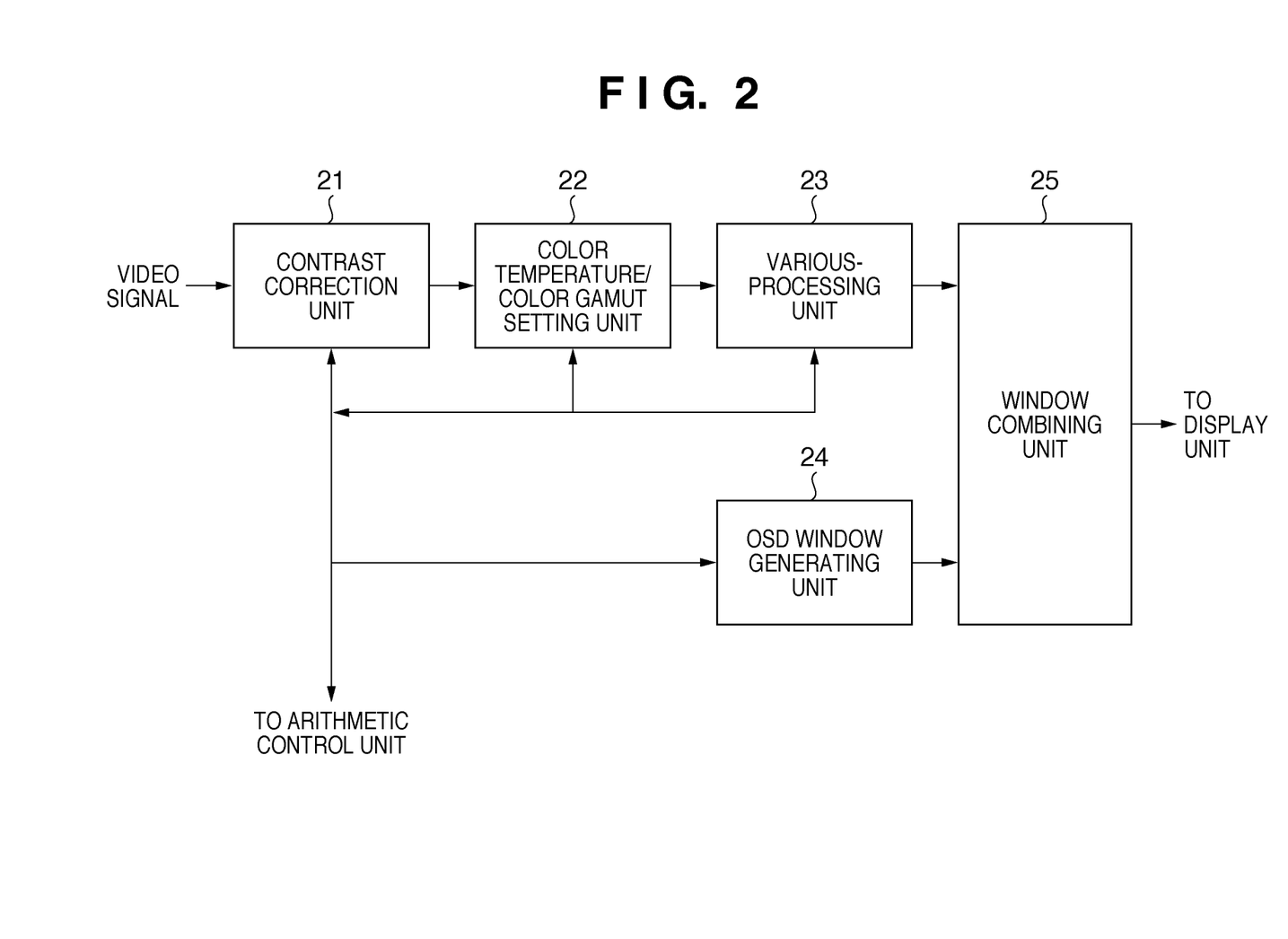
FIG. 2 is a block diagram showing an example of the internal arrangement of a video signal processing unit 20.

FIG. 2 is a block diagram showing an example of the internal arrangement of the video signal processing unit 20.

A contrast correction unit 21 receives a video signal from the receiving unit 10. The contrast correction unit 21 performs contrast correction for the video signal in accordance with a preset gamma curve. Note that the gamma curve can be changed in accordance with an instruction from the arithmetic control unit 40, as needed. A technique of performing contrast correction using such a gamma curve is known, and hence a description of the technique will be omitted. The contrast correction unit 21 transmits the video signal after contrast correction to a color temperature/color gamut setting unit 22 on the subsequent stage.

The color temperature/color gamut setting unit 22 sets a white point (color temperature setting) and a color gamut for the video signal received from the contrast correction unit 21 on the basis of a preset color matrix. In this embodiment, in particular, the color temperature/color gamut setting unit 22 performs a color correction process for the video signal received from the contrast correction unit 21 on the basis of the color temperature information currently set in the color temperature/color gamut setting unit 22.

The color temperature/color gamut setting unit 22 then transmits the video signal having undergone this process to a various-processing unit 23 on the subsequent stage.

The various-processing unit 23 performs processes such as individual color correction using a lookup table and sharpness control for the video signal received from the color temperature/color gamut setting unit 22. The various-processing unit 23 transmits the video signal after such processes to a window combining unit 25 on the subsequent stage.

An OSD window generating unit 24 generates an OSD window upon receiving an instruction to generate an OSD window from the arithmetic control unit 40, and transmits a video signal representing the generated OSD window to the window combining unit 25 on the subsequent stage.

The window combining unit 25 transmits the video signal received from the various-processing unit 23 to the display unit 30. Upon receiving the video signal representing the OSD window from the OSD window generating unit 24, the window combining unit 25 generates a video signal representing a window obtained by combining the window (OSD window) represented by the video signal with the window represented by the video signal received from the various-processing unit 23. The window combining unit 25 transmits the generated video signal to the display unit 30.

The concrete operation of each unit shown in FIGS. 1 and 2 will be described next by referring to a concrete example. The following description can therefore be applied to cases different from the concrete example.

Assume that in the following description, the broadcast receiving apparatus has received a broadcast signal representing "baseball broadcast from ○○ dome" and is playing back a video of the broadcast program on the display unit 30.

If the user wants to perform color correction for the video displayed on the display unit 30, he/she presses an instruction button of a remote controller or the like (not shown) to make the display unit 30 display a menu for facility-specific color correction. Since a menu display instruction is input to the arithmetic control unit 40 with this operation, the arithmetic control unit 40 reads out data stored in the storage unit 50 and transmits the data to the video signal processing unit 20.

Figure 7:
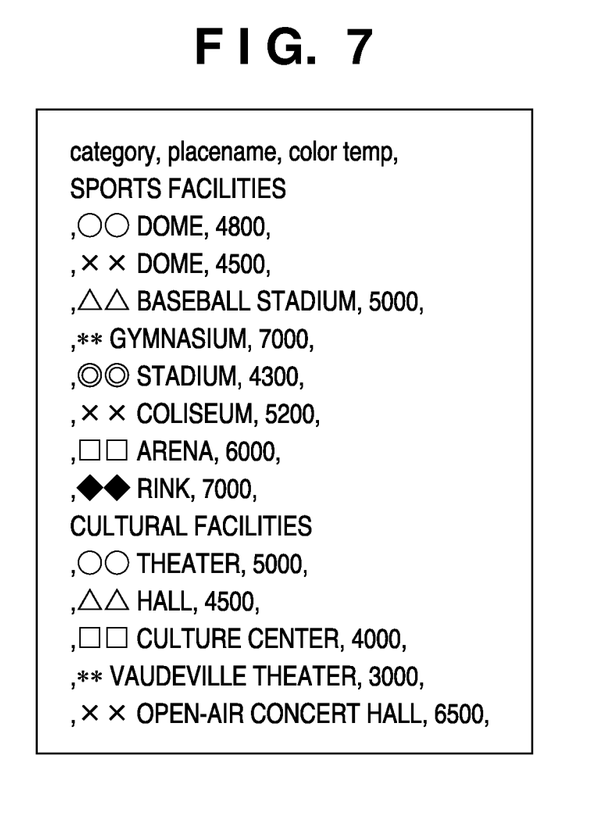
FIG. 7 is a view showing an example of the arrangement of data read out by an arithmetic control unit 40 from a storage unit 50.

FIG. 7 is a view showing an example of the arrangement of data read out by the arithmetic control unit 40 from the storage unit 50. As shown in FIG. 7, the storage unit 50 stores and holds sets of pieces of location information (○○ dome, xx dome, and the like) indicating possible locations where broadcast program capturing can be performed and pieces of color temperature information (4,800, 4,500, and the like) in the locations in correspondence with various locations (for the respective locations). Note that the data format to be used is not specifically limited. It suffices to use CSV files or binary codes.

The arithmetic control unit 40 reads out the data of each set and sequentially transmits it to the video signal processing unit 20.

Figure 3:
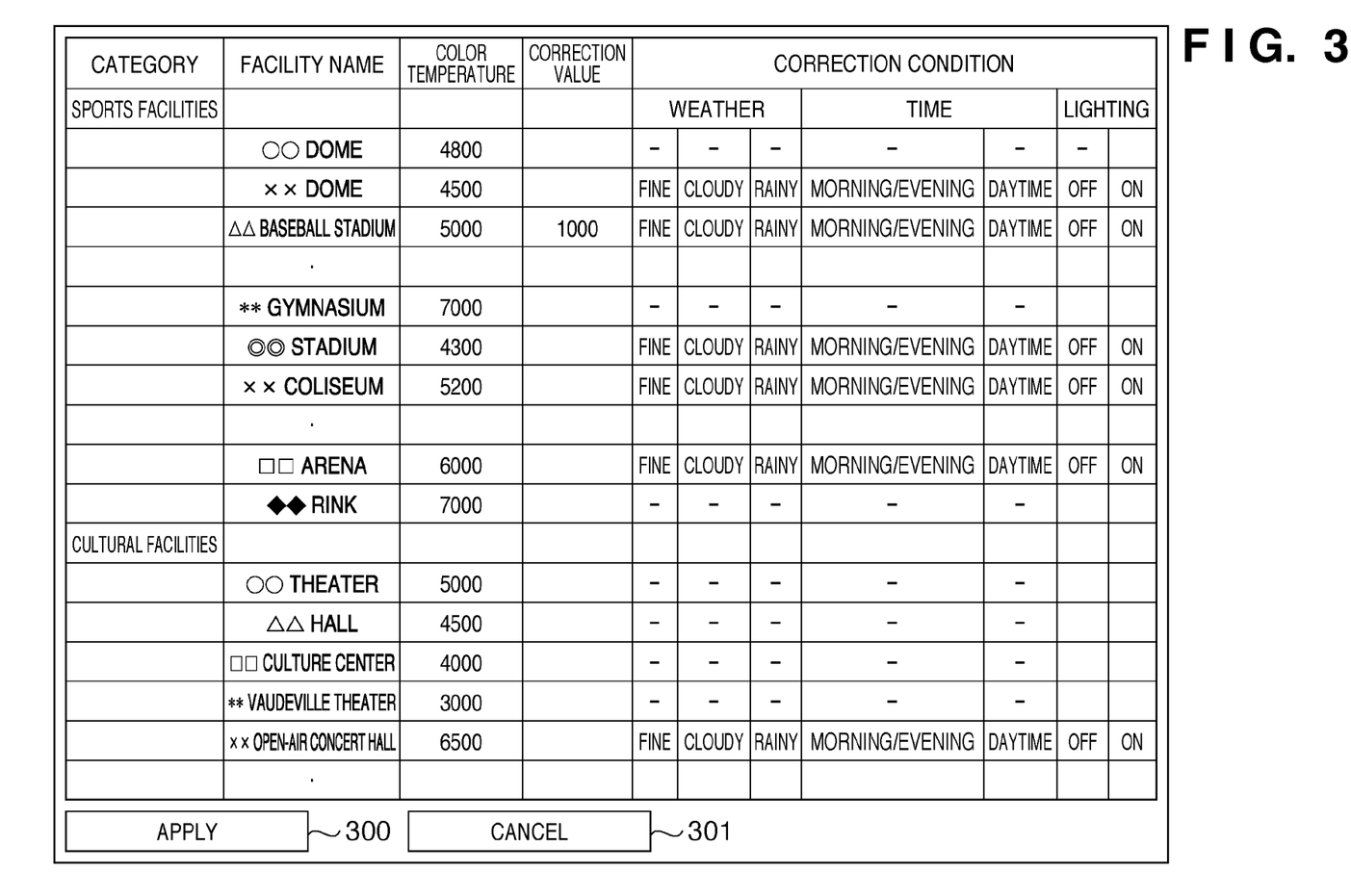
FIG. 3 is a view showing a display example of a window showing possible locations where broadcast program capturing can be performed, color temperatures in the locations, and correction conditions for the color temperatures, in the form of a list, for each location.

The video signal processing unit 20 (OSD window generating unit 24) generates the OSD window shown in FIG. 3 by using the data received from the arithmetic control unit 40.

FIG. 3 is a view showing a display example of a window showing possible locations where broadcast program capturing can be performed, color temperatures in the locations, and correction conditions for the color temperatures, in the form of a list, for each location.

As shown in FIG. 3, such OSD windows are classified according to the "categories" of possible locations where broadcast program capturing can be performed. For each category, the name of the location (facility name) is displayed. Color temperatures in the respective locations are displayed in association with the locations. Correction values and correction conditions will be described later.

Upon generating such an OSD window, the video signal processing unit 20 transmits, to the display unit 30, a signal obtained by combining a video signal representing the generated OSD window with a video signal representing a baseball broadcast. The OSD window is combined with the video of the baseball broadcast. The resultant video is displayed on the display unit 30.

In this case, the broadcast program currently displayed on the display unit 30 (which the user is currently viewing) is the one from "○○ dome", and hence it is natural for the user to want to perform color correction for the video currently displayed on the display unit 30 in accordance with the color temperature in "○○ dome". The user therefore designates the position of "○○ dome" on the window in FIG. 3 by using the above remote controller. Various methods of designating a desired position on a window are available, and the method to be used is not specifically limited.

Upon detecting such an instruction, the arithmetic control unit 40 reads out location information indicating "◯◯ dome" stored in the storage unit 50, together with the color temperature information "4,800" which is in set with the location information, and transmits the readout color temperature information to the video signal processing unit 20.

The color temperature/color gamut setting unit 22 in the video signal processing unit 20 temporarily saves the currently set color temperature information in its own heap memory. The color temperature/color gamut setting unit 22 then sets the color temperature information received from the arithmetic control unit 40, and performs a color correction process for the video signal received from the contrast correction unit 21 by using the color temperature value "4,800" indicated by the color temperature information. A color correction process using a color temperature value is a known technique, and hence a description of the technique will be omitted.

With this operation, the display unit 30 displays the video having undergone color correction in accordance with the color temperature in "◯◯ dome", which is the location designated by the user.

In this case, upon seeing the window after color correction which is displayed on the display unit 30, the user determines whether to apply color correction or cancel it, and designates one of button images 300 and 301 in accordance with the determination result.

When the user designates the button image 300, the arithmetic control unit 40 transmits an instruction to stop outputting the OSD window in FIG. 3 to the OSD window generating unit 24. The OSD window generating unit 24 therefore stops outputting the OSD window. Therefore, the OSD image is not displayed on the display unit 30, and a video of a baseball broadcast in ◯◯ dome is displayed.

If the user designates the button image 301, the arithmetic control unit 40 sets again, in the color temperature/color gamut setting unit 22, the color temperature information which the color temperature/color gamut setting unit 22 temporarily saved in the heap memory. Subsequently, therefore, the color temperature/color gamut setting unit 22 performs color correction by using the color temperature information temporarily saved in the heap memory. When the operator designates the button image 301, the arithmetic control unit 40 also transmits, to the OSD window generating unit 24, an instruction to stop outputting the OSD window in FIG. 3, and hence the OSD window generating unit 24 stops outputting the OSD window. Consequently, the display unit 30 does not display the OSD window and displays a video of a baseball broadcast in ◯◯ dome.

Some facilities have outdoor lightings, and other facilities take outdoor light as part of illumination even if they are roofed. For example, many baseball stadiums use no lightings during daytime and turn on the lighting equipment from evening to night. That is, in some cases, a color temperature cannot be uniquely determined from location information alone.

Under the circumstances, this embodiment allows the user to designate correction conditions on the menu window in FIG. 3. For example, the user can designate whether the current weather in "◯◯ dome" is fine, cloudy, or rainy. The user can also designate whether the current time zone is morning/evening or daytime. The user can further designate whether the lightings in "◯◯ dome" are currently OFF or ON.

Assume that the amount by which a color temperature is corrected (correction value) is determined in advance in accordance with a combination (environment) of various correction conditions, and the data of correction values (the data of correction values for the respective environments) corresponding to the respective combinations (environments) of correction conditions are registered in the storage unit 50 in advance. Assume that "1,000" is registered as a correction value in advance in the storage unit 50 in association with a combination (environment) of "ΔΔ baseball stadium" as location information, "cloudy" as weather information, "daytime" as time information, and "OFF" as lighting information. In this case, as shown in FIG. 3, this value "1,000" is displayed at a position corresponding to the environment.

When a correction condition is set in addition to location information, a correction value is determined. The arithmetic control unit 40 therefore updates the corresponding color temperature information by adding the correction value to the color temperature value indicated by the color temperature information determined in accordance with the location information. The updated color temperature information is then transmitted to the color temperature/color gamut setting unit 22. The operation of the color temperature/color gamut setting unit 22 which has received the updated color temperature information is the same as that to be performed when it receives color temperature information which has not been updated by using a correction value. This operation is the same as that described above.

Note that the data of the OSD window in FIG. 3 is not limited to that to be stored and held in the broadcast receiving apparatus. It suffices to store and hold such data in another apparatus and download the data from the apparatus when the broadcast receiving apparatus is to use it. In this case, if illumination information in a facility is measured in real time and is sequentially transmitted to the broadcast receiving apparatus, color correction adaptive to a constantly varying state can also be performed at the time of a live broadcast.

Alternatively, a broadcast signal may incorporate ambient color information in a location associated with a content, acquire it as color temperature information, and perform color correction by using it. In addition, ambient color information associated with video information stored in a storage medium can be acquired as color temperature information.

Figure 8:
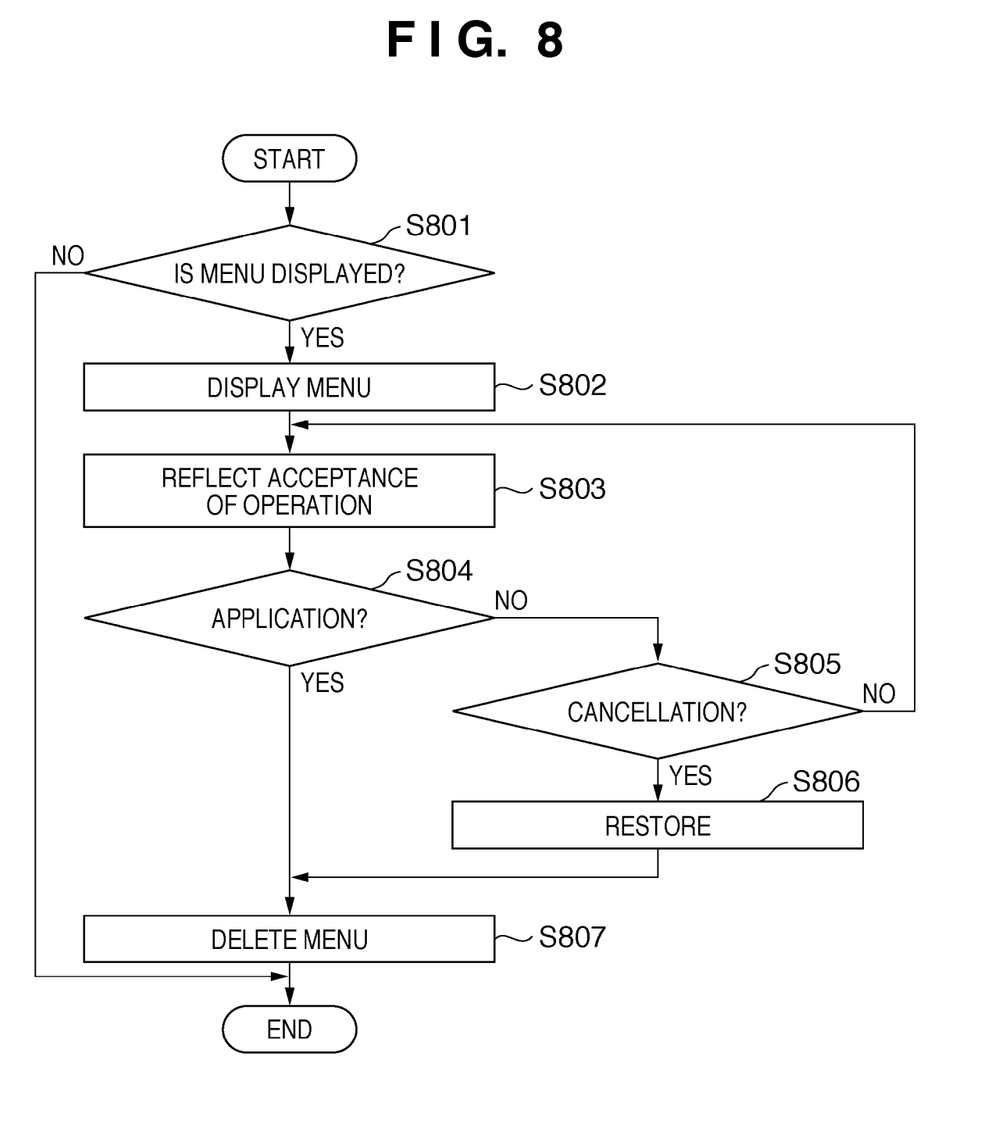
FIG. 8 is a flowchart for processing to be performed by the broadcast receiving apparatus when a user selects location information by using a remote controller while the broadcast receiving apparatus plays back broadcast program information.

FIG. 8 is a flowchart for processing to be performed by the broadcast receiving apparatus when a user selects location information by using a remote controller or the like while the broadcast receiving apparatus plays back broadcast program information.

First of all, in step S801, the arithmetic control unit 40 determines whether an instruction to display a menu for facility-specific color correction on the display unit 30 has been received from the remote controller. Upon determining that such an instruction has not been received, the arithmetic control unit 40 terminates the processing based on the flowchart of FIG. 8 and plays back general broadcast program information.

If the arithmetic control unit 40 has received such an instruction, the process advances to step S802.

In step S802, the arithmetic control unit 40 reads out data stored in the storage unit 50 and transmits it to the video signal processing unit 20. The video signal processing unit 20 (OSD window generating unit 24) generates the OSD window shown in FIG. 3 by using the data received from the arithmetic control unit 40. Upon generating the OSD window, the OSD window generating unit 24 transmits a video signal representing the generated OSD window to the window combining unit 25. The window combining unit 25 then transmits, to the display unit 30, a signal obtained by combining the video signal representing the OSD window with a video signal of a baseball broadcast. The OSD window is therefore displayed on the display unit 30, upon being combined with the video of the baseball broadcast.

The user sees the OSD window in FIG. 3 which is displayed on the display unit 30 and designates one of pieces of location information by using the remote controller. The user can designate a correction condition, as needed. In step S803, therefore, the arithmetic control unit 40 accepts corresponding operation.

Upon accepting location information, the arithmetic control unit 40 reads out color temperature information stored in the storage unit 50 in set with the location information. Upon accepting the correction information, the arithmetic control unit 40 reads out a correction value corresponding to a combination of items selected regarding three elements, i.e., weather, time, and illumination, as the correction condition from the storage unit 50. The arithmetic control unit 40 then corrects the color temperature information by adding the readout correction value to the color temperature information read out in advance. Obviously, when no correction condition is designated, it suffices not to correct color temperature information. The arithmetic control unit 40 transmits the color temperature information to the video signal processing unit 20.

The color temperature/color gamut setting unit 22 in the video signal processing unit 20 temporarily saves the currently set color temperature information in its heap memory. The color temperature/color gamut setting unit 22 then sets, in itself, the color temperature information received from the arithmetic control unit 40, and performs a color correction process for the video signal received from the contrast correction unit 21 by using the color temperature value indicated by the color temperature information.

The window combining unit 25 combines the video signal after the color correction by the color temperature/color gamut setting unit 22 with the video signal from the OSD window generating unit 24 via the various-processing unit 23. The display unit 30 displays the video signal after the combining operation as a video.

In step S804, the arithmetic control unit 40 checks whether the user has designated the button image 300 by using the remote controller. If it is determined as a result of the check that the user has designated the image, the process advances to step S807. If it is determined that the user has not designated the image, the process advances to step S805.

In step S807, the arithmetic control unit 40 transmits an instruction to stop outputting the OSD image in FIG. 3 to the OSD window generating unit 24. The OSD window generating unit 24 then stops outputting the OSD window. The display unit 30 therefore displays a video of a baseball broadcast in ○○ dome without displaying the OSD window.

In step S805, the arithmetic control unit 40 checks whether the user has designated the button image 301 by using the remote controller. If it is determined as a result of this check that the user has designated the image, the process advances to step S806. If it is determined that the user has not designated the image, the process returns to step S803.

In step S806, the arithmetic control unit 40 sets again, in the color temperature/color gamut setting unit 22, the color temperature information which the color temperature/color gamut setting unit 22 has temporarily saved in the heap memory. The color temperature/color gamut setting unit 22 performs color correction by using the color temperature information temporarily saved in the heap memory.

According to the above description, this embodiment can acquire color temperature information corresponding to a location which is used in a broadcast program, because the color temperature information is stored and held for each location (for each facility in the embodiment). This makes it possible to provide the user with a video having undergone color correction based on the acquired color temperature information.

Second Embodiment

In the first embodiment, location information indicating the location used by the currently played-back broadcast program is acquired by being selected from the menu window. In the second embodiment, EPG information is acquired, and location information indicating the location used by the currently played-back broadcast program is acquired from the acquired EPG information.

EPG information will be described below. EPG information is a broadcast program list provided by data broadcasting or via a network. This list describes the categories of broadcast programs, outlines of the broadcast program contents, and the like, as well as the broadcast times of the respective broadcast programs, for each broadcast program. Such information is therefore convenient for broadcast program selection and the like, and hence is widely used for video recording and viewing of broadcast programs on a cable TV which has many channels.

EPG information often includes pieces of location information indicating capturing locations of broadcast programs.

Figure 4:
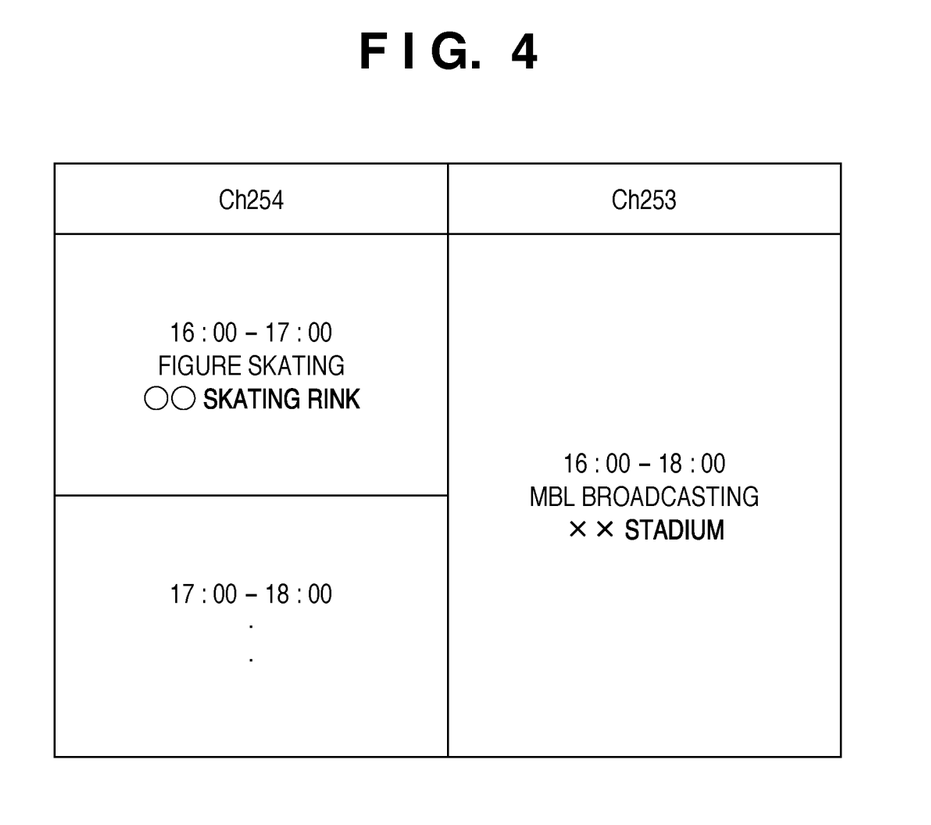
FIG. 4 is a view showing an example of the arrangement of part of EPG information.

FIG. 4 is a view showing an example of the arrangement of part of EPG information. FIG. 4 shows the information of broadcast programs to be broadcast on channel (CH) 254 and channel 255 between 16:00 to 18:00. As shown in FIG. 4, for example, the user can know that the broadcast program (figure skating) on channel 254 between 16:00 to 17:00 will be broadcast in ○○ skating rink. That is, in this case, "○○ skating rink" is location information corresponding to the broadcast program.

According to this embodiment, therefore, first of all, such EPG information is downloaded. Of the pieces of information associated with a plurality of broadcast programs contained in the downloaded EPG information, information corresponding to the currently played-back (viewed) broadcast program is extracted, and the pieces of location information stored and held in the storage unit 50 are searched by using a character string contained in the extracted information as a keyword. Location information for which there is a hit as a result of this search is acquired from the storage unit 50. Color temperature information corresponding to the acquired location information is acquired from the storage unit 50 in the same manner, and a color correction process is performed for the currently viewed video of the broadcast program by using the acquired color temperature information.

Note that the broadcast receiving apparatus according to this embodiment is the same as that used in the first embodiment.

In this case, when the user issues an instruction to download EPG information by using the above remote controller, an arithmetic control unit 40 receives the instruction, accesses a site by using URL information registered in advance, and downloads the EPG information in its own memory.

When this download operation is complete, the display unit 30 displays the downloaded EPG information. For example, FIG. 4 shows this display form. The user sees this display and selects/designates one broadcast program by using the remote controller. Assume that the user has selected MBL broadcasting to be performed on channel 255 between 16:00 and 18:00. The arithmetic control unit 40 then causes the receiving unit 10 to select channel 255. That is, the arithmetic control unit 40 causes the receiving unit 10 to receive the broadcast signal at channel 255. When each unit operates in the same manner as that described in the first embodiment, the video of the broadcast program currently broadcast on channel 255 is displayed on the display unit 30.

The arithmetic control unit 40 extracts partial information, of the pieces of information associated with a plurality of broadcast programs contained in the downloaded EPG information, which corresponds to the selected/designated broadcast program (the broadcast program of an MBL broadcast on channel 255 in the above case). The arithmetic control unit 40 then searches the pieces of location information stored and held in the storage unit 50 by using a character string contained in the extracted partial information as a keyword. The location information for which there is a hit as a result of the search is acquired from the storage unit 50. The arithmetic control unit 40 then acquires color temperature information corresponding to the acquired location information from the storage unit 50 in the same manner. The acquired color temperature information is then set in the color temperature/color gamut setting unit 22. The subsequent operation is the same as that in the first embodiment.

This makes it possible to perform a color correction process corresponding to the location used by the broadcast program without bothering the user.

In the above case, only a location search is performed. However, the apparatus may be configured to analyze the broadcast program end time in EPG information and cancel correction at the end time. This can prevent the user from watching another broadcast program while keeping specific settings unchanged.

In the above case, EPG information is used to select a broadcast program. However, this apparatus can be configured to designate a channel first and then acquire information about the broadcast program.

Figure 5:
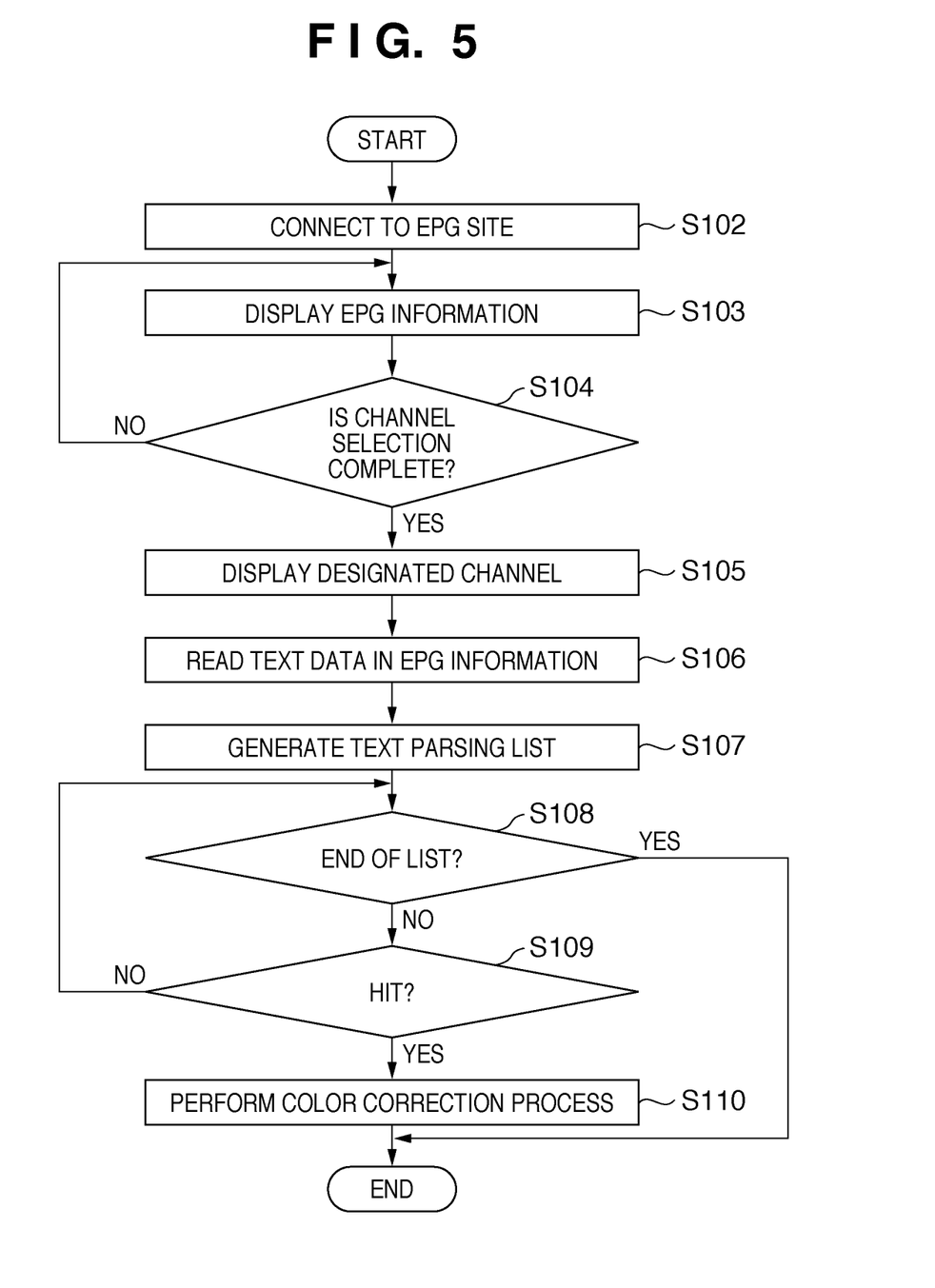
FIG. 5 is a flowchart for a color correction process performed by a broadcast receiving apparatus according to the second embodiment of the present invention using EPG information.

FIG. 5 is a flowchart for a color correction process performed by the broadcast receiving apparatus according to the this embodiment using EPG information.

First of all, the user issues an instruction to download EPG information by using the remote controller. In step S102, the arithmetic control unit 40 receives the instruction, accesses a site by using URL information registered in advance, and downloads the EPG information in its own memory. If there are plurality of sites, it suffices to make the user select one of the sites which he/she will access or to sequentially access the plurality of sites.

In step S103, the arithmetic control unit 40 displays the downloaded EPG information on a display unit 30. The display form to be used in this case may be a general browser API or the like, or EPG information can be displayed in a unique form. The user then sees the display and selects/designates one broadcast program by using the remote controller.

When the arithmetic control unit 40 detects the selection instruction, the process advances to step S105 via step S104. The process returns to step S103 via step S104 as long as such a selection instruction is not detected.

In step S105, the arithmetic control unit 40 causes a receiving unit 10 to select the channel of the broadcast program selected by the above selection instruction.

In step S106, the arithmetic control unit 40 searches for and extracts partial information (e.g., text data), of the pieces of information of a plurality of broadcast programs contained in the downloaded EPG information, which corresponds to the selected/designated broadcast program.

In step S107, the arithmetic control unit 40 extracts a character string (word) contained in the partial information extracted in step S106, and generates a list by sequentially registering the extracted word in the list from its head. Note that a word is extracted by text parsing using a line feed, space, punctuation, or the like as a delimiter.

The arithmetic control unit 40 then sequentially refers to the respective words registered in the list from its head. In step S108, the arithmetic control unit 40 determines whether the currently referred word is the last word registered in the list. Upon determining that the word is the last word, the arithmetic control unit 40 terminates this processing. Otherwise, the process advances to step S109.

In step S109, the arithmetic control unit 40 searches the pieces of location information stored and held in the storage unit 50 by using the currently referred word as a keyword. If there is no hit for the keyword, the process returns to step S108. The arithmetic control unit 40 then refers to the word next to the currently referred word and performs subsequent processing.

If there is a hit for the keyword as a result of the above search, the process advances to step S110.

In step S110, the arithmetic control unit 40 acquires location information as a hit for the keyword from the storage unit 50. The arithmetic control unit 40 acquires color temperature information corresponding to the acquired location information from the storage unit 50 in the same manner as described above, and sets the acquired color temperature information in the color temperature/color gamut setting unit 22, thereby causing it to perform a color correction process. This operation is the same as that in the first embodiment.

If there are pieces of location information as hits, the arithmetic control unit 40 may cause the display unit 30 to display the respective pieces of location information so as to prompt the user to select one of the pieces of information.

In step S107, if a description associated with time like "16:00 to 17:00" is extracted, the description may be stored as a correction application time in the memory to apply correction only within the time.

In this embodiment, EPG information is acquired by downloading it from a site. However, the form of acquiring EPG information is not limited to this. It suffices to search the pieces of location information in the storage unit 50 by using information contained in broadcast target data in digital broadcasting as a keyword.

Assume that this broadcast is live. In this case, when there is a hit for location information, the area indicated by the location information and the weather and the current time in the area are specified. It suffices to perform a color correction process by using these pieces of specified information as elements constituting a correction condition. In this case, it is necessary to register correction values in the broadcast receiving apparatus in advance in correspondence with the respective combinations of these elements. Such operation is almost the same as that in the first embodiment.

Third Embodiment

If there is no influence of the viewing environment of a user, original colors can be reproduced by using color temperature information corresponding to location information as in each embodiment described above. Consider general viewing environments for TV sets. In most cases, users watch TV programs in bright locations such as living rooms. In such cases, it suffices to set the difference between color temperature information corresponding to location information and the color temperature information of standard color temperature D65 as the display color temperature of a TV set in each home which is adjusted in consideration of the lighting in the living room.

Note, however, that since the value (kelvin) of a color temperature difference does not directly correspond to the color difference, subsequent processing is performed upon conversion of the color temperature into a mired value in the following description. A mired value is represented by (1000000/color temperature value). Equal mired values indicate similar color differences.

Assume that the color temperature in a location where a broadcast program is captured is CTs=5000K, and the color temperature set in a TV set (broadcast receiving apparatus) in the home of a user who views the broadcast program is CTd=9000K.

Since standard color temperature D65=6504K, the mired value difference between color temperature D65 and the color temperature CTs is 1000000/6504−1000000/5000=46. Since the mired value of CTd is 1000000/9000=111, the color temperature CTd that should be set in the TV set again is 1000000/(111+46)=6410K.

That is, correcting the color to the color at 6410K makes it possible to perform correction, in the TV set environment, for the lighting in the location where the broadcast program is captured.

As described above, if the color temperature information set in the broadcast receiving apparatus deviates from D65, it suffices to use a difference value from the standard value as described above.

That is, in the first and second embodiments, the color temperature information acquired from the storage unit 50 as color temperature information corresponding to acquired location information can be recalculated in the above manner.

According to the above description, this embodiment can perform color correction in a state reflecting an adjustment value for the viewing environment of a user by performing color correction with the difference from the preset standard value.

The above description mainly concerns locations where lightings exist. If, however, information equivalent to D65 can be prepared in accordance with season, time, weather, and the like, this embodiment can be applied to outdoor facilities and areas.

This embodiment has exemplified the case in which data for each location is applied without any change. However, data can be corrected as needed in accordance with the characteristics of a display device, a location of interest in a facility, and the like.

In addition, registering color temperature information corresponding to specific colors such as the color of turf in a table in advance makes it possible to perform color correction suitable for each facility as well as mainly performing correction for the color temperature of the lighting in each location.

Furthermore, it suffices to combine two or more of the above embodiments.

Other Embodiments

Obviously, the object of the present invention can be achieved in the following manner. That is, a recording medium (or a storage medium) storing software program codes for implementing the functions of the above embodiments is supplied to a system or apparatus. Obviously, such a storage medium is a computer-readable storage medium. The computer (or the CPU or MPU) of the system or apparatus reads out and executes the program codes stored in the recording medium. In this case, the program codes read out from the recording medium implement the functions of the above embodiments by themselves, and the recording medium storing the program codes constitutes the present invention.

When the computer executes the readout program codes, the operating system (OS) running on the computer performs part or all of actual processing on the basis of the instructions of the program codes. Obviously, the present invention incorporates a case in which the functions of the above embodiments are implemented by this processing.

Assume that the program codes read out from the recording medium are written in the memory of a function expansion card inserted into the computer or a function expansion unit connected to the computer. Obviously, the present invention incorporates a case in which the CPU of the function expansion card or function expansion unit performs part or all of actual processing on the basis of the instructions of the program codes, and the functions of the above embodiments are implemented by the processing.

When the present invention is to be applied to the above recording medium, program codes corresponding to the flowcharts described above are stored in the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-101816, filed Apr. 9, 2008, which is hereby incorporated by reference herein in its entirety.

What is claimed is:

1. A display device comprising:
an input unit configured to input a broadcast program as content;
a holding unit configured to hold sets of pieces of location information indicating possible locations where broadcast program capturing can be performed and pieces of color temperature information corresponding to the locations;
an acquisition unit configured to acquire one piece of location information held in said holding unit;
a correction unit configured to perform a color correction process for the content on the basis of color temperature information held in said holding unit in correspondence with location information acquired by said acquisition unit; and
a first display unit configured to display a video based on the content which has undergone color correction by said correction unit.

2. The device according to claim 1, wherein said acquisition unit comprises
a second display unit configured to display location information and color temperature information held in said holding unit in the form of a list,
a selection unit configured to accept a selection instruction to select one piece of location information displayed by said display unit, and
an acquisition unit configured to acquire the location information selected by the selection instruction from said holding unit.

3. The device according to claim 1, wherein
said holding unit further holds, for each environment in a location where the broadcast program capturing can be performed, a correction value for correcting color temperature information in the location,
said acquisition unit further acquires a correction value corresponding to one of the environments, and said correction unit performs a color correction process based on color temperature information corrected by adding the correction value acquired by said acquisition unit to color temperature information held in said holding unit in correspondence with location information acquired by said acquisition unit.

4. The device according to claim 1, wherein said acquisition unit comprises an acquiring unit configured to acquire EPG information, and an extracting unit configured to extract information, of pieces of information associated with a plurality of contents included in the EPG information, which corresponds to a currently played-back content, search pieces of location information held in said holding unit by using a character string included in the extracted information as a keyword, and acquire location information for which there is a hit by the search from said holding unit.

5. A display method comprising steps of:

inputting a broadcast program as content;

acquiring one piece of location information from a holding unit holding sets of pieces of location information indicating possible locations where broadcast program capturing can be performed and pieces of color temperature information corresponding to the locations;

performing a color correction process for the content on the basis of color temperature information held in the holding unit and set with location information acquired in the acquiring step; and displaying a video based on the content which has undergone color correction in the correcting step.

6. A broadcast receiving apparatus which receives a broadcast signal of a broadcast program transmitted from a selected broadcast station and outputs the broadcast program to a display device on the basis of the received broadcast signal, the apparatus comprising:

a holding unit configured to hold sets of pieces of location information indicating possible locations where broadcast program capturing can be performed and pieces of color temperature information corresponding to the locations;

an acquisition unit configured to acquire one piece of location information held in said holding unit;

a correction unit configured to perform a color correction process for a video signal included in a broadcast signal of the broadcast program on the basis of color temperature information held in said holding unit in correspondence with location information acquired by said acquisition unit; and a unit configured to output a video based on the video signal which has undergone color correction by said correction unit to the display device.

7. A broadcast receiving method performed by a broadcast receiving apparatus which receives a broadcast signal of a broadcast program transmitted from a selected broadcast station and outputs the broadcast program to a display device on the basis of the received broadcast signal, the method comprising steps of:

acquiring one piece of location information from a holding unit holding sets of pieces of location information indicating possible locations where broadcast program capturing can be performed and pieces of color temperature information corresponding to the locations;

performing a color correction process for a video signal included in a broadcast signal of the broadcast program on the basis of color temperature information held in the holding unit in correspondence with acquired location information; and outputting a video based on a video signal which has undergone color correction in the step of performing the color correction process to the display device.

* * * * *